(No Model.) 2 Sheets—Sheet 1.

J. RADDIN.
HUB ATTACHING DEVICE.

No. 370,818. Patented Oct. 4, 1887.

WITNESSES:
Jos. H. Shepherd.
J. Naschold.

INVENTOR
John Raddin
BY
E. Frank Woodbury.
ATTORNEY (No Model.) 2 Sheets—Sheet 2.

J. RADDIN.
HUB ATTACHING DEVICE.

No. 370,818. Patented Oct. 4, 1887.

WITNESSES:
Jos. H. Shepherd.
J. Naschold.

INVENTOR
John Raddin.
BY E. Frank Woodbury.
ATTORNEY

UNITED STATES PATENT OFFICE.

JOHN RADDIN, OF LYNN, MASSACHUSETTS.

HUB-ATTACHING DEVICE.

SPECIFICATION forming part of Letters Patent No. 370,818, dated October 4, 1887.

Application filed March 19, 1887. Serial No. 231,610. (No model.)

*To all whom it may concern:*

Be it known that I, JOHN RADDIN, of Lynn, in the county of Essex and State of Massachusetts, have invented certain new and useful Improvements in Wagon Axles and Boxes, of which the following, taken in connection with the accompanying drawings, is a specification.

My invention relates to improvements in wagon axles and boxes in which a circular locking-key, fitting into a circumferential groove in the axle, retains the box and wheel which is attached to box securely in place. Said key is secured by a ring or a sleeve around the end of the box, and as a further security the ring or sleeve is locked in its position; and my invention also relates to wagon axle and box designed as an improvement of wagon axle and box devices as shown and described in United States of America Letters Patent granted to me January 12, 1886, No. 334,049; and it has for its object simplicity in construction, perfection in detail, and completeness in its capacity as a simple, strong, durable, and effective wagon axle and box.

It also has for its object, first, to provide an effective and a secure method for oiling the axle and box, so that they will run a long time after oiling; second, to insure a convenient, clean, and quick method of taking off the wheel to clean axle and box; third, to simplify the method of attaching the wheel and box to the axle, by which the joints are made dust-proof.

Figure 1:
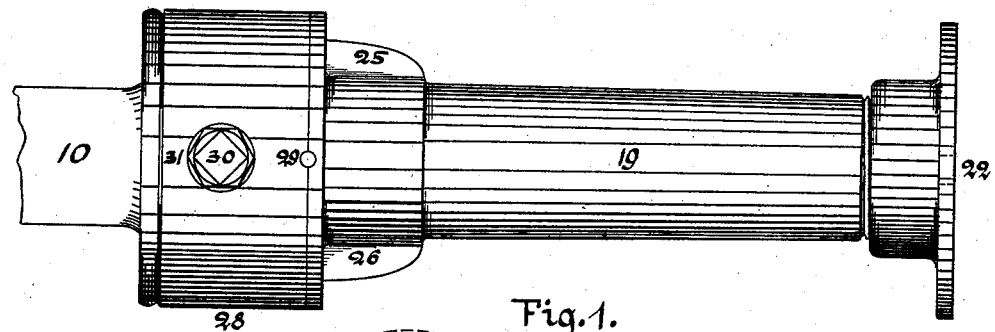
Figure 3:
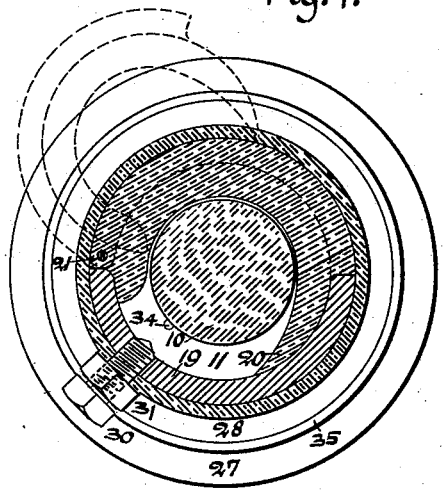
Figure 2:
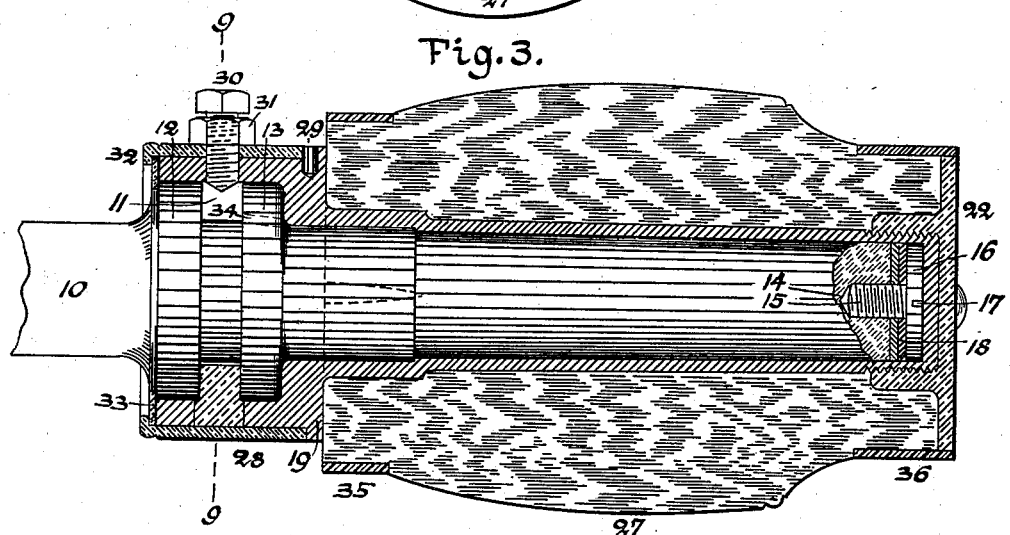
Figure 4:
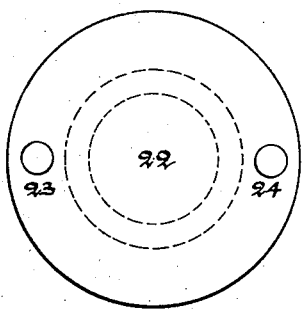
Figure 7:
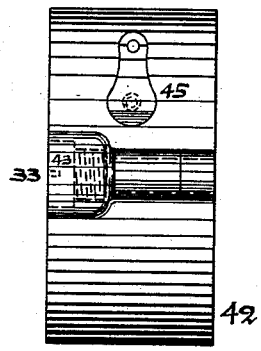
Figures 6, 8:
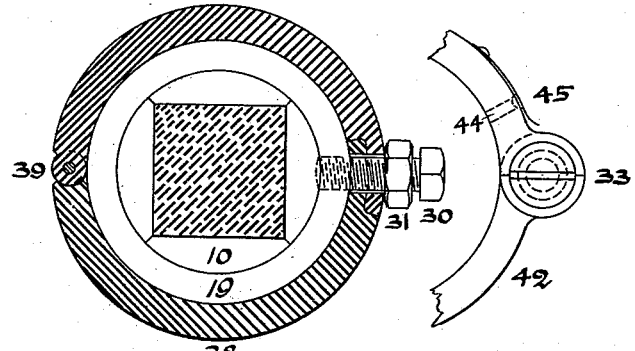
Figure 5:
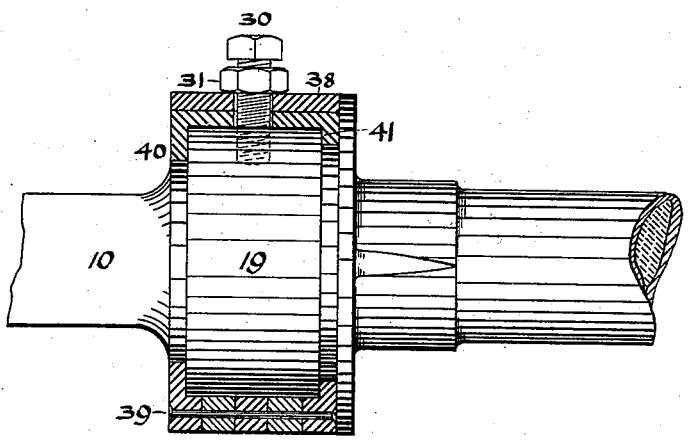

Figure 1 represents my invention of wagon axle and box in side elevation; and Fig. 2 is a central longitudinal section of Fig. 1, and also of hub of wheel attached to axle-box, showing axle in part section and axle-box in full section. Fig. 3 is a full transverse sectional view of Fig. 2 on section-line 9 9, looking toward end of axle, and also showing key by dotted lines raised out of its locking position. Fig. 4 represents axle-box nut in front elevation, said nut being represented in Fig. 1 in side elevation and in Fig. 2 in section. Fig. 5 represents axle and box in side elevation with a portion broken off, and it also represents in section a modified form of ring or sleeve such as is represented in central transverse section by Fig. 6. Fig. 6 is an end view of Fig. 5, showing in full central transverse section ring or sleeve. Fig. 7 represents a modified form of hinged ring as shown in Figs. 5 and 6, illustrating a modified style of hinge and an oil-hole cap device. Fig. 8 is a partial side elevation of Fig. 7, illustrating style of fastening hinged ring and oil-hole cap device.

The axle 10 has a circumferential groove, 11, formed in its enlarged end, and is provided with the two collars 12 and 13. The end of the axle is provided with the tapped central hole, 14, adapted to receive the tap-bolt 15, which is provided with the circular head 16, which is provided with the slot 17. Between the tap-bolt head and the end of axle are placed shims 18, or, if desired, check-nuts. The axle is also provided with oil-hole 34, which extends from groove 11 to axle-bearing.

The axle-box 19 is bored to fit the axle, (except groove.) It is provided in its enlarged end with a circumferential slot adapted to receive circular locking-key 20, which is made wider in the box than in the groove to allow it to be babbitted when the key and axle are worn. The locking-key is hinged to the box by means of pin 21. The end of the box is threaded to receive the axle-box nut 22, which is provided with the holes 23 and 24 for spanner-wrench and screws. The box is also provided with the usual fins, 25 and 26, adapted to prevent rotation of wheel-hub 27 upon the box. The box at its enlarged end has fitted to it the sleeve 28, which is centrally located by centering-pin 29, and is fastened to the box by means of set-screw 30 and check-nut 31. The sleeve 28 is provided with the shoulder 32, which is adapted to receive the joint-ring 33, which may be of hinge form, if desired, in such a manner that the joint-ring will prevent the oil from escaping through the circular joint between the axle and box. The wheel-hub 27 is provided with the usual rings, 35 and 36.

All the parts being made of suitable material and constructed as described, they are put together as follows: The wheel-hub is forced onto the axle-box in the usual manner, and is prevented from rotating thereon by means of the fins in the ordinary manner. Then the axle-box nut is screwed up on the threaded end of axle-box by means of a spanner-wrench, which is inserted in holes 23 and 24, thereby firmly holding the wheel-hub longitudinally between the enlarged end of the axle-box and axle-box nut. The axle-box nut is held in place rotatively upon the axle-box by means of screws which pass through the nut into the wheel-hub, the head of one of the screws being represented in Fig. 2. The axle-box is then placed upon the axle and the collar 13, having a side bearing against the enlarged portion of the axle-box. The tap-bolt is so adjusted that its head will have a bearing against the inside of end of axle-box, and is held in its adjusted position by means of shims or check-nuts, or in any suitable well-known manner. The tap-bolt may be adjusted in the same manner, as described, to compensate for wear. The circular locking-key is then fitted to the groove formed by the collars on the axle in such a manner as shown, and will securely lock the axle to the box. The key is of such a shape as will present the largest possible lateral wearing-surfaces against the collars. The outside of the key is of a form that coincides with circumference of axle-box into which it is fitted. The sleeve, which is made to fit the axle-box, is provided with a shoulder, which is adapted to hold the joint-ring against the circular joint between the axle and box, so as to prevent the escape of oil. The sleeve is located in its position by means of a centering-pin, and is fastened to the axle-box by means of set-screw and check-nut.

When in use it is desired to oil the axle, the set-screw is removed and oil injected into groove in axle through set-screw hole, where it may flow onto axle-bearing through oil-hole provided in axle-collar.

When it is desired to remove the axle-box for cleaning purposes, the set-screw and check-nut are removed. Then the sleeve is pushed back to uncover locking-key, which is raised, as represented by dotted lines in Fig. 3, out of contact with axle. Then the axle-box may be removed from axle. When the operation of cleaning is completed, the box is pushed upon the axle, and the locking-key dropped into its position. The sleeve is then slid into its position and fastened by set-screw and check-nut to the axle-box, as before.

The modified forms of ring or sleeve, as represented by Figs. 5, 6, 7, and 8, are constructed as follows: The axle-box 19 shown in elevation in Fig. 5 is the same in its interior construction as axle-box 19 as represented by Figs. 1, 2, and 3, and is the same in its exterior construction, except that it is provided with the circular recess into which the shoulder or lip 41 fits, and it is also provided with the shoulder over which fits the shoulder or lip 40, which covers the circular joint between axle-box and axle. The ring 38 is hinged by means of hinge 39 and is fastened to axle-box by means of set-screw 30, which passes through both ends of the ring and check-nut 31. It is also provided with shoulder 40, of such a depth as will perform the same duty as sleeve-shoulder 32 and joint-ring 33, as represented in Fig. 2. It is also provided with the shoulder 41, by means of which the ring is held in its located position upon the axle-box. The hinged ring 42 has the same interior shape as ring 38, the only difference being in the method of fastening it to axle-box and the oiling arrangement. The two parts of the ring 42 are held together by means of screw 43, which passes through both halves of the ring and securely fastens them together. The ring is provided with the oil-hole 44, which is covered by the spring-cap 45, and which may be either raised or pushed one side when it is necessary to oil the axle.

What I claim as new, and desire to secure by Letters Patent, is—

1. The combination of the axle-box 19, provided with the locking-key 20, hinged thereto, with axle 10, provided with collars 12 and 13, substantially as set forth.

2. The combination of the sleeve 28 or hinged ring with locking-key 20, substantially as described.

3. The combination of sleeve 28, provided with shoulder 32, with joint-ring 33, substantially as described.

4. The combination of the axle 10, provided with collars 12 and 13, with tap-bolt 15 and shims or check-nuts 18, substantially as described.

5. The combination, with axle and box, of locking-key 20, sleeve 28, and joint-ring 33.

6. The combination of axle-box 19 with sleeve 28, provided with set-screw 30 and check-nut 31, substantially as described.

In testimony whereof I have signed my name to this specification, in the presence of two subscribing witnesses, on this 12th day of March, A. D. 1887.

JOHN RADDIN.

Witnesses:
E. FRANK WOODBURY,
JOS. H. SHEPHERD.